United States Patent
Lim

(10) Patent No.: US 11,313,942 B2
(45) Date of Patent: Apr. 26, 2022

(54) METHOD AND APPARATUS FOR IDENTIFYING LOCATION INFORMATION OF SIGNAL SOURCE BY USING UNMANNED AERIAL VEHICLE

(71) Applicant: Electronics and Telecommunications Research Institute, Daejeon (KR)

(72) Inventor: Kwang Jae Lim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 319 days.

(21) Appl. No.: 16/733,141

(22) Filed: Jan. 2, 2020

(65) Prior Publication Data
US 2020/0278418 A1    Sep. 3, 2020

(30) Foreign Application Priority Data
Jan. 2, 2019 (KR) .................. 10-2019-0000315

(51) Int. Cl.
*G01S 5/04* (2006.01)
*H04W 4/029* (2018.01)
*G01S 5/02* (2010.01)
*G05D 1/10* (2006.01)
*H01Q 21/08* (2006.01)

(52) U.S. Cl.
CPC .............. *G01S 5/04* (2013.01); *G01S 5/021* (2013.01); *G01S 5/0221* (2013.01); *G05D 1/101* (2013.01); *H01Q 21/08* (2013.01); *H04W 4/029* (2018.02)

(58) Field of Classification Search
CPC .......... G01S 5/04; G01S 5/021; G01S 5/0221; G05D 1/101

USPC ......................................................... 342/451
See application file for complete search history.

(56) References Cited

U.S. PATENT DOCUMENTS

| | | | |
|---|---|---|---|
| 2015/0226833 A1* | 8/2015 | Liu ...................... | G01S 5/0247 342/352 |
| 2016/0217692 A1 | 7/2016 | Lee | |
| 2017/0215220 A1 | 7/2017 | Kim et al. | |

(Continued)

FOREIGN PATENT DOCUMENTS

| | | | | |
|---|---|---|---|---|
| EP | 1031847 B1 * | 6/2006 | ............... | G01S 5/12 |
| KR | 1020170082016 A | 7/2017 | | |
| WO | WO-2018120735 A1 * | 7/2018 | ............. | G01C 11/12 |

*Primary Examiner* — Harry K Liu
(74) *Attorney, Agent, or Firm* — William Park & Associates Ltd.

(57) ABSTRACT

Disclosed is a method of identifying location information of a signal source, the method including: identifying, at a first position, first position information and first posture information of an UAV equipped with a linear array antenna; identifying, after identifying a first measured azimuth between the signal source and the antenna at the first position, a first corrected azimuth; identifying, at at least one second position, at least one piece of second position information and at least one of second posture information of the UAV; identifying, after identifying at least one second measured azimuth between the signal source and the antenna at the at least one second position, at least one second corrected azimuth; and estimating the location information of the signal source by using the first position information, the first posture information, the first corrected azimuth, the second position information, the second posture information, and the second corrected azimuth.

14 Claims, 13 Drawing Sheets

(56) References Cited

U.S. PATENT DOCUMENTS

2017/0234961 A1* 8/2017 Steltz .................. G01S 1/68
                                                   342/457
2018/0025651 A1* 1/2018 Anderson ............. B64C 39/024
                                                   701/2
2021/0409892 A1* 12/2021 Yamamoto ............ G10L 19/008

* cited by examiner

METHOD AND APPARATUS FOR IDENTIFYING LOCATION INFORMATION OF SIGNAL SOURCE BY USING UNMANNED AERIAL VEHICLE

CROSS REFERENCE TO RELATED APPLICATION

The present application claims priority to Korean Patent Application No. 10-2019-0000315, filed Jan. 2, 2019, the entire contents of which is incorporated herein for all purposes by this reference.

BACKGROUND OF THE INVENTION

Field of the Invention

The present disclosure relates generally to a location information identification technology. Particularly, the present disclosure relates to a method and an apparatus for identifying location information by using azimuths measured at linear array antennas.

Description of the Related Art

Recently, due to the development of industrial technology and the rapid development of information and communications technology, as the technological development of an unmanned aerial vehicle such as a drone has been accelerated and expanded, its field of use has become wider.

For example, an unmanned aerial vehicle is equipped with a device that can load goods to provide medical or emergency relief goods to disaster areas where traffic is not restored, or to attempt to provide a transport service, such as a courier service, for quickly delivering goods ordered by a user. Further, unmanned aerial vehicles are utilized in various fields, for example, an unmanned aerial vehicle equipped with a camera may perform relay broadcasting of sports events, monitor beaches or construction sites for safety accidents, spray pesticides on farmland, or perform dangerous work in places that are difficult for people to access.

The foregoing is intended merely to aid in the understanding of the background of the present invention, and is not intended to mean that the present invention falls within the purview of the related art that is already known to those skilled in the art.

SUMMARY OF THE INVENTION

A location of a signal source on the ground can be found using an unmanned aerial vehicle. For example, a signal source may be a jammer generating unwanted radio signals, or may be a signal source generating signals for search and rescue.

In order to identify location information of a signal source on the ground by using an unmanned aerial vehicle, a device capable of measuring the Direction of Arrival (DoA) of the signal source, reception time difference, frequency difference, and the like, is required.

Specifically, Direction of Arrival of the signal source may be measured through an array antenna provided in the unmanned aerial vehicle. Further, in order to measure three-dimensional location information of the signal source, the azimuth and the elevation need to be measured using the Direction of Arrival of the signal source. To this end, the unmanned aerial vehicle needs to be equipped with a two-dimensional array antenna or circular array antenna.

However, when the unmanned aerial vehicle is equipped with the two-dimensional array antenna or circular array antenna, the array antenna of the unmanned aerial vehicle increases in weight and size, and thus power for driving the same also increases. Further, compared with the case of measuring only the azimuth by a one-dimensional array antenna, since two-dimensional azimuth and elevation need to be measured, the computational complexity in signal processing for measuring the Direction of Arrival rapidly increases, resulting in increases in size, power, and weight of a processor equipped in the unmanned aerial vehicle. In order to equip the two-dimensional linear array antenna or circular array antenna in the unmanned aerial vehicle, a large-size unmanned aerial vehicle is required. It is impossible to measure three-dimensional location information of the ground station using a small-size unmanned aerial vehicle.

Further, in estimating the location of the signal source by using the unmanned aerial vehicle equipped with the linear array antenna, when there is a difference in altitude between the unmanned aerial vehicle and the signal source, a difference between the actual azimuth and the azimuth measured by the unmanned aerial vehicle equipped with the linear array antenna occurs.

The present disclosure is intended to propose a method and an apparatus for more accurately detecting and correcting an azimuth by using an unmanned aerial vehicle equipped with a linear array antenna.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to one aspect of the present disclosure, a method of identifying location information of a signal source is provided. The method includes: identifying, at a first position, first position information and first posture information of the unmanned aerial vehicle equipped with a linear array antenna; identifying, after identifying a first measured azimuth between the signal source and the linear array antenna at the first position, a first corrected azimuth in which the first measured azimuth is corrected considering a difference between the measured azimuth and an estimated azimuth according to a change in elevation; identifying, at at least one second position, at least one second position information and at least one second posture information of the unmanned aerial vehicle equipped with the linear array antenna; identifying, after identifying at least one second measured azimuth between the signal source and the linear array antenna at the at least one second position, at least one second corrected azimuth in which at least one second measured azimuth is corrected considering the difference between the measured azimuth and the estimated azimuth according to the change in elevation; and estimating the location information of the signal source by using the first position information, the first posture information, the first corrected azimuth, the at least one second position information, the at least one second posture information, and the at least one second corrected azimuth.

According to another aspect of the present disclosure, an apparatus for identifying location information of a signal source is provided. The apparatus includes: a flight control processing unit identifying position information and posture information of an unmanned aerial vehicle, and controlling movement of the unmanned aerial vehicle; a linear array antenna; and a signal source location identification unit configured to, measure, by using the linear array antenna, a measured azimuth corresponding to a signal received from the signal source; identify a corrected azimuth in which the measured azimuth is corrected considering a difference between the measured azimuth and an estimated azimuth according to a change in elevation; identify multiple position information, multiple posture information, and the multiple corrected azimuths respectively corresponding to multiple different UAV positions; and identify the three-dimensional location information of the signal source on the basis of the multiple position information, the multiple posture information, and the multiple corrected azimuths.

According to still another aspect of the present disclosure, a system for identifying location information of a signal source is provided. The system includes: at least one unmanned aerial vehicle, equipped with a linear array antenna, configured to, identify a measured azimuth to measure signals received at the linear array antenna; identify position information and posture information of the at least one unmanned aerial vehicle; and a ground station configured to, receive the position information and posture information, and the measured azimuth from the at least one unmanned aerial vehicle; identify a corrected azimuth in which the measured azimuth is corrected considering a difference between the measured azimuth and an estimated azimuth according to a change in elevation; identify multiple position information, multiple posture information, and the multiple corrected azimuths respectively corresponding to multiple different UAV positions; and identify a three-dimensional location information of the signal source on the basis of the multiple positions information, the multiple postures information, and the multiple corrected azimuths.

It is to be understood that the foregoing summarized features are exemplary aspects of the following detailed description of the present disclosure without limiting the scope of the present disclosure.

According to the present disclosure, it is possible to provide the method and the apparatus for identifying three-dimensional location information of the signal source by using the azimuths measured at multiple positions by the unmanned aerial vehicle equipped with the linear array antenna.

Also, according to the present disclosure, it is possible to provide the method and the apparatus for accurately identifying three-dimensional location information of the signal source by using a small-size unmanned aerial vehicle.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
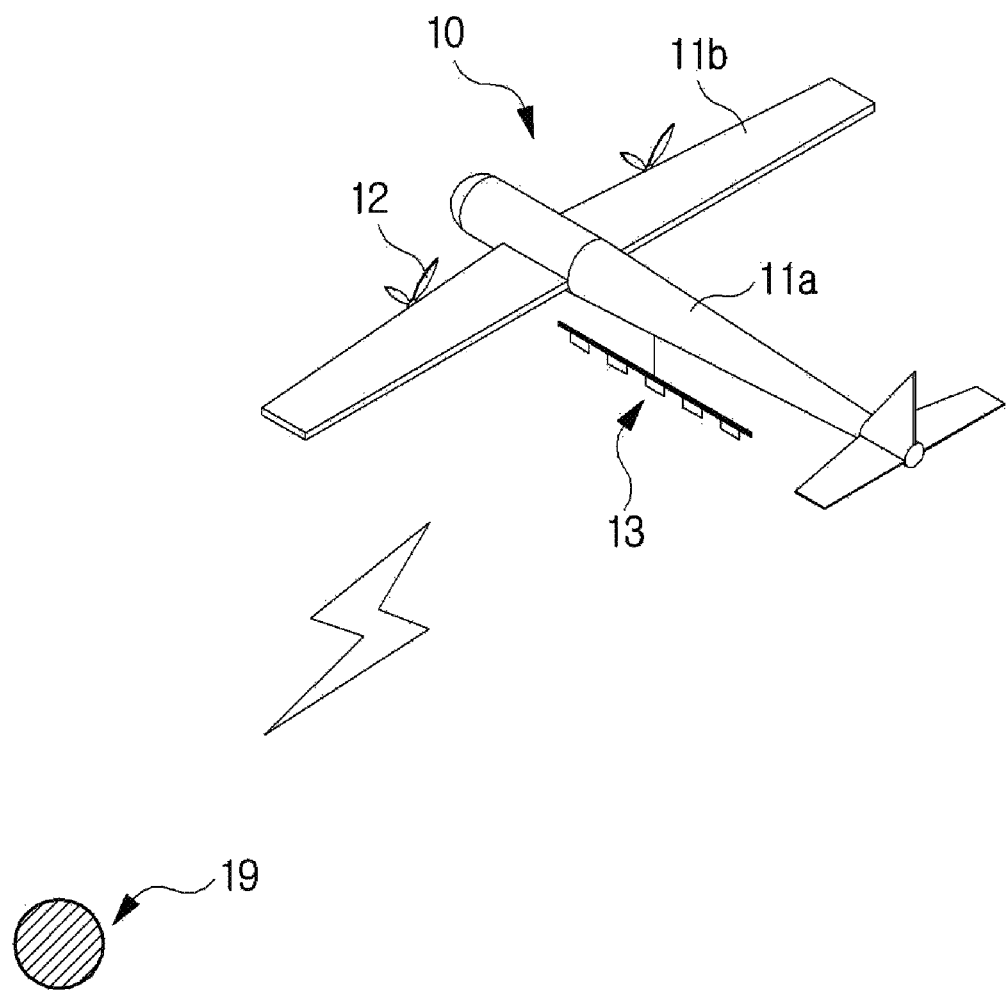
FIG. 1 is a diagram illustrating an example of an unmanned aerial vehicle according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

Figure 2:
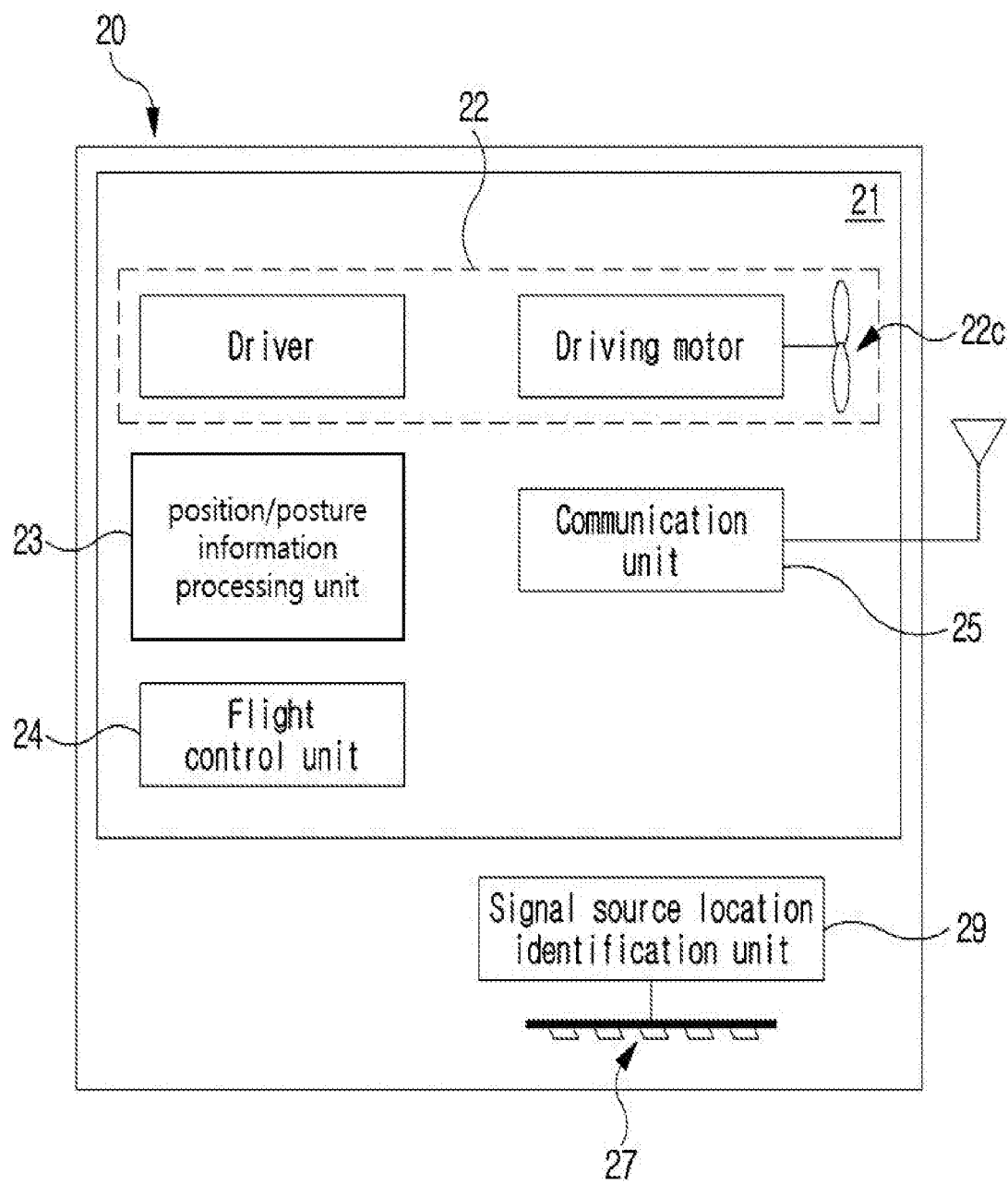
FIG. 2 is a block diagram illustrating a configuration of an unmanned aerial vehicle according to an embodiment of the present disclosure.

FIG. 1 is a diagram illustrating an example of an unmanned aerial vehicle according to an embodiment of the present disclosure. FIG. 2 is a block diagram illustrating a configuration of an unmanned aerial vehicle according to an embodiment of the present disclosure.

Referring to FIG. 1, the unmanned aerial vehicle 10 according to the embodiment of the present disclosure includes a body 11, a rotary wing driver 12, and a linear array antenna 13, which are coupled to the body 11.

The body 11 may include a base body 11a, and a fixed wing 11b.

The base body 11a may be provided at the central portion of the unmanned aerial vehicle 10 and may be configured to provide a space therein where a predetermined device is possibly equipped. For example, the internal space provided in the base body 11a may be equipped with the following units: a power supply unit (for example, a battery) supplying power to the unmanned aerial vehicle 10; a flight control processing unit identifying the position information and the posture information of the unmanned aerial vehicle 10, and controlling the movement; a signal source location identification unit identifying a three-dimensional location information of a signal source 19 on the basis of a signal measured by the linear array antenna 13.

The fixed wing 11b supports at least one rotary wing driver 12 coupled and fixed to the body 11, and may include a structure that is capable of moving the unmanned aerial vehicle 10 with physical force generated by the rotary wing driver 12. The linear array antenna 13 is a set of antennas in which multiple (for example, p) component antennas are arranged in a linear array, and the multiple component antennas may be spaced apart from each other at predetermined intervals. Further, the linear array antenna 13 may be coupled to a part (for example, the base body 11a) of the body 11, and may be connected to the signal source location identification unit so that an RF signal from the signal source 19 is detected and is then provided to the signal source location identification unit.

Although in the embodiment of the present disclosure, as an example, the unmanned aerial vehicle 10 is an unmanned aerial vehicle using lift force generated by multiple rotary wing drivers 12, and the corresponding structure involves the body 11 and the rotary wing driver 12, the present disclosure is not limited thereto. The unmanned aerial vehicle according to present disclosure may be any unmanned aerial vehicle that can move without a user on board by using a control signal transmitted from a remote place or a control signal based on a predetermined route. The body 11 and the rotary wing driver 12 may vary in structure and shape. For example, examples of the unmanned aerial vehicle may include a rotary-wing (for example, a quadcopter, a hexacopter) or fixed-wing unmanned aerial vehicle (UAV), and the like.

The signal source 19 may be a jammer generating unwanted radio signals, or may be an entity generating signals for search and rescue.

In the meantime, referring to FIG. 2, an unmanned aerial vehicle 20 may include a flight control processing unit 21, a linear array antenna 27, and a signal source location identification unit 29.

The flight control processing unit 21 may include a rotary wing driving unit 22, a position/posture information processing unit 23, and a flight control unit 24.

The rotary wing driving unit 22 corresponds to the rotary wing driver 12 shown in FIG. 1, and may include a driving motor 22a, a driver 22b, and a rotary wing 22c. The driver 22b may provide power, for example, electric power, required for driving the driving motor 22a. Particularly, rotational speed of the driving motor 22a may be controlled through control of voltage or current corresponding to a control signal provided from the flight control unit 24.

The position/posture information processing unit 23 may identify the position information and the posture information of the unmanned aerial vehicle 10, and may then provide the two types of information to the flight control unit 24 or the signal source location identification unit 29. For example, the position/posture information processing unit 23 may include a GPS processing module detecting its position information on the basis of a GPS signal, and may provide the position information detected on the basis of the GPS signal. Further, the position/posture information processing unit 23 may include a sensor detecting movement of the unmanned aerial vehicle 10, for example, an acceleration sensor, a gyro sensor, a geomagnetic sensor, or the like. The position/posture information processing unit 23 may provide information indicating yaw, pitch, and roll angles ($\alpha$, $\beta$, and $\gamma$) as the posture information.

The unmanned aerial vehicle 20 may further include a communication unit 25. The communication unit 25, for communication between a ground station and the unmanned aerial vehicle, may receive a control command of the ground station or may transmit data collected by the unmanned aerial vehicle to the ground station.

The flight control unit 24 may generate and provide a control signal for controlling the operations of the rotary wing driving unit 22, the position/posture information processing unit 23, and the communication unit 25. Further, the flight control unit 24 may generate the control signal by applying a signal or information provided from the rotary wing driving unit 22, the position/posture information processing unit 23, and the communication unit 25.

For example, the flight control unit 24 may set, on the basis of the position information provided from the position/posture information processing unit 23, travel paths to multiple predetermined destinations; and may control the rotary wing driving unit 22 in such a manner that the unmanned aerial vehicle 10 moves along the set paths.

As another example, the communication unit 25 may communicate with the ground station, and may receive the travel path provided from the ground station for provision to the flight control unit 24. Accordingly, the flight control unit 24 may control the rotary wing driving unit 22 in such a manner that the unmanned aerial vehicle 10 moves along the identified travel path.

As still another example, the communication unit 25 may receive a flight control signal provided from the ground station in real time for provision to the flight control unit 24, and the flight control unit 24 may control the rotary wing driving unit 22 on the basis of the flight control signal.

The linear array antenna 27 corresponds to the linear array antenna 13 shown in FIG. 1, and the signal source location identification unit 29 is connected to the linear array antenna 27. The signal source location identification unit 29 may measure the azimuth between the linear array antenna 27 and the signal source based on the RF signal detected by the linear array antenna 27.

Further, the signal source location identification unit 29 may identify multiple position location information and multiple posture information provided from the position/posture information processing unit 23, may identify multiple measured azimuths corresponding thereto, and may identify three-dimensional location information of the signal source using the multiple position information, multiple posture information, and the multiple measured azimuths.

In the meantime, in the case where there is a difference in altitude between the unmanned aerial vehicle 10 and the signal source 19, there may be a problem that there is a difference between the azimuth measured by the unmanned aerial vehicle 10 and the actual azimuth. Particularly, the signal source location identification unit 29 may calculate an azimuth more accurately using a corrected azimuth in which the difference between the azimuth measured by the unmanned aerial vehicle 10 and the actual azimuth is corrected.

Hereinafter, the operation of calculating the measured azimuth by the signal source location identification unit 29 will be described in detail.

Figure 3:
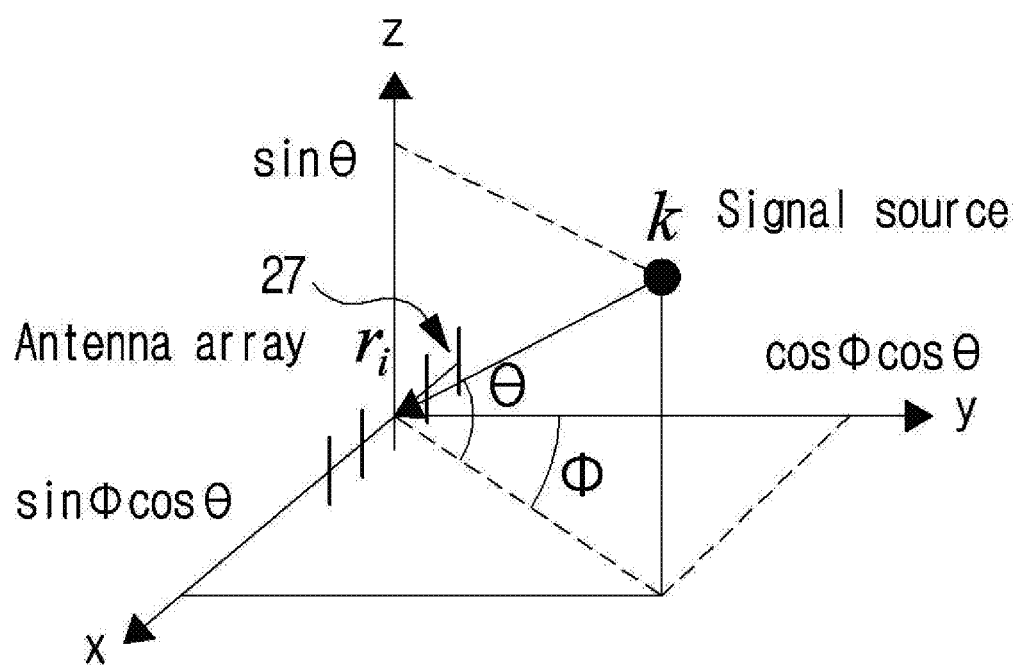
FIG. 3 is a diagram illustrating a location relation between an unmanned aerial vehicle and a signal source according to an embodiment of the present disclosure.

FIG. 3 is a diagram illustrating a location relation between an unmanned aerial vehicle and a signal source according to an embodiment of the present disclosure.

The signal source location identification unit 29 may estimate Direction of Arrival between the linear array antenna 27 and the signal source by using steering vectors of the linear array antenna 27.

The steering vector of the linear array antenna 27 including the multiple (for example, p) antenna elements may be represented as shown in Equation 1 below.

$$a(\phi, \theta) = (a_1, a_2, \ldots, a_p)^T, \text{ where}$$
$$a_i(\phi, \theta) = \exp\left(j\frac{2\pi}{\lambda}k^T\tau_i\right) \text{ for } i = 1, 2, \ldots, P$$
$$k = (\sin\phi\cos\theta \quad \cos\phi\cos\theta \quad \sin\theta)^T$$
$$\tau_i = (x_i \quad y_i \quad z_i)^T \text{ for } i = 1, 2, \ldots, P$$

[Equation 1]

As shown in FIG. 3, when the linear array antenna 27 is linearly provided on the X-axis, element values of steering vectors corresponding to the respective antenna elements are calculated as shown in Equation 2.

$$a_i^{ULA}(\phi, \theta) = \exp\left(j\frac{2\pi}{\lambda}x_i\sin\phi\cos\theta\right)$$

[Equation 2]

As shown in Equation 2, with a one-dimensional array, it is impossible to distinguish between the azimuth ($\phi$) and the elevation ($\theta$). When the elevation ($\theta$) is 0°, the element value of the steering vector consisting of only the azimuth ($\phi$) is represented as shown in Equation 3.

$$a_i^{ULA}(\phi'_{ULA}) = \exp\left(j\frac{2\pi}{\lambda}x_i\sin\phi'_{ULA}\right)$$

[Equation 3]

Therefore, the signal source location identification unit 29 may calculate the element value of the steering vector through the operation in Equation 3. As described above, the element value of the steering vector calculated through Equation 3 may be accurately measured when the elevation ($\theta$) is 0°. From this, the azimuth ($\phi$) of the signal source 19 may be accurately estimated. However, in the case where the elevation ($\theta$) is not 0°, when the azimuth ($\phi$) of the signal source 19 is estimated using the steering vector calculated through Equation 3, there is a difference with the actual azimuth ($\phi$).

Figure 4:
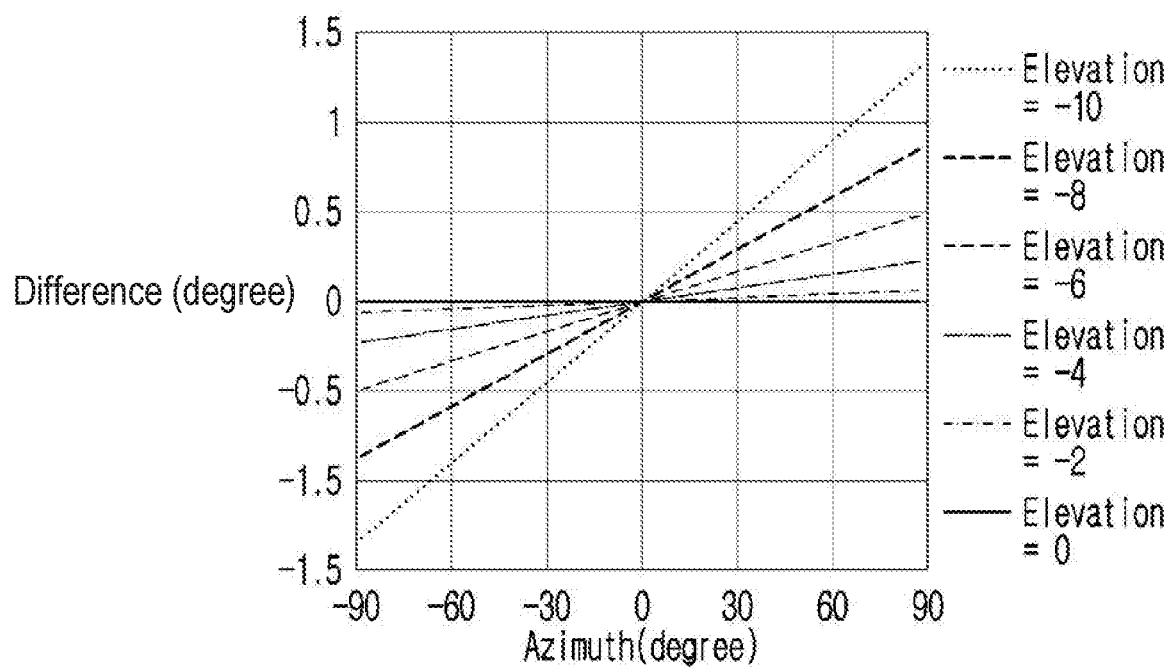
FIG. 4 is a diagram illustrating an example of a difference between an actual azimuth and an azimuth measured by an unmanned aerial vehicle according to an embodiment of the present disclosure.

FIG. 4 is a diagram illustrating an example of a difference between an actual azimuth and an azimuth measured by an unmanned aerial vehicle according to an embodiment of the present disclosure.

Referring to FIG. 4, as the elevation ($\theta$) is large and the azimuth ($\varphi$) exceeds the reference value (0°), the difference value between the actual azimuth and the estimated azimuth increases when estimating the azimuth (4). Based on this, the signal source location identification unit 29 may correct the azimuth using a nominal elevation ($\theta_{norm}$) and the position of the unmanned aerial vehicle.

First, the signal source location identification unit 29 may measure the azimuth ($\phi_{est}$) using the linear array antenna 27, and may calculate a corrected azimuth ($\phi'_{est}$) considering the above-described difference between the actual azimuth and the estimated azimuth ($\phi_{est}$). For example, the corrected azimuth ($\phi'_{est}$) may be calculated through the operation in Equation 4 below.

$$\phi'_{est} = \sin^{-1}(\sin\phi_{est}/\cos\theta_{est})$$

[Equation 4]

In order to calculate the corrected azimuth ($\phi'_{est}$) through Equation 4, the estimated elevation ($\theta_{est}$) is required. The estimated elevation ($\theta_{est}$) may be defined as in Equation 5 below.

$$\theta_{est} = f(\alpha, \beta, \gamma, \phi_{est}, \theta_{norm})$$

[Equation 5]

The signal source location identification unit 29 may calculate, on the basis of Equation 5 above, the corrected azimuth ($\phi'_{est}$) using information, such as the posture (yaw ($\alpha$), pitch ($\beta$), and roll ($\gamma$)) of the unmanned aerial vehicle, the estimated azimuth (($\varphi_{est}$), the nominal elevation ($\theta_{norm}$), and the like.

For example, the signal source location identification unit 29 may use the posture (yaw ($\alpha$), pitch ($\beta$), and roll ($\gamma$)) of the unmanned aerial vehicle to identify rotated angle information ($\phi_{rot}$ and $\theta_{rot}$) of the unmanned aerial vehicle, which is based on the nominal elevation ($\theta_{norm}$) for all the azimuths within a range of azimuths.

Herein, the nominal elevation ($\theta_{norm}$) is a fixed value given according to the cruising altitude of the unmanned aerial vehicle, and may be a predetermined value that is approximately calculated on the basis of the altitude of the unmanned aerial vehicle and the approximate distance to the signal source. For example, when the unmanned aerial vehicle flies at an altitude of 2 km to find the signal source and the horizontal distance to the signal source is about 20 km, the nominal elevation ($\theta_{norm}$) is set to −5 degrees.

Next, the signal source location identification unit 29 may identify the difference ($|\phi_{est}-\phi_{rot}|$) between the measured azimuth and the rotated azimuth. The signal source location identification unit 29 may identify the difference ($|\phi_{est}-\phi_{rot}|$) between the measured azimuth and the rotated azimuth such that the rotation azimuth and the rotated elevation ($\phi^*_{rot}$ and $\theta^*_{rot}$) when having the smallest difference value may be determined. The signal source location identification unit 29 may determine, as the estimated elevation ($\phi_{est}$), the rotated elevation ($\theta^*_{rot}$) having the smallest difference value identified as described above.

As a result, the signal source location identification unit 29 applies the estimated elevation ($\theta_{est}$) through the above-described operation to Equation 4 so that even if there is a change in elevation, it is possible to calculate the corrected azimuth ($\phi'_{est}$) which is close to the actual azimuth.

Hereinafter, an operation of identifying three-dimensional location information of the signal source 19 by using multiple position information, multiple posture information, multiple measured azimuths, and the like will be described in detail.

In the operation of identifying the three-dimensional location information to be described later, the measured azimuth may include the corrected azimuth calculated through the above-described operation of calculating the measured azimuth.

Figure 5A:
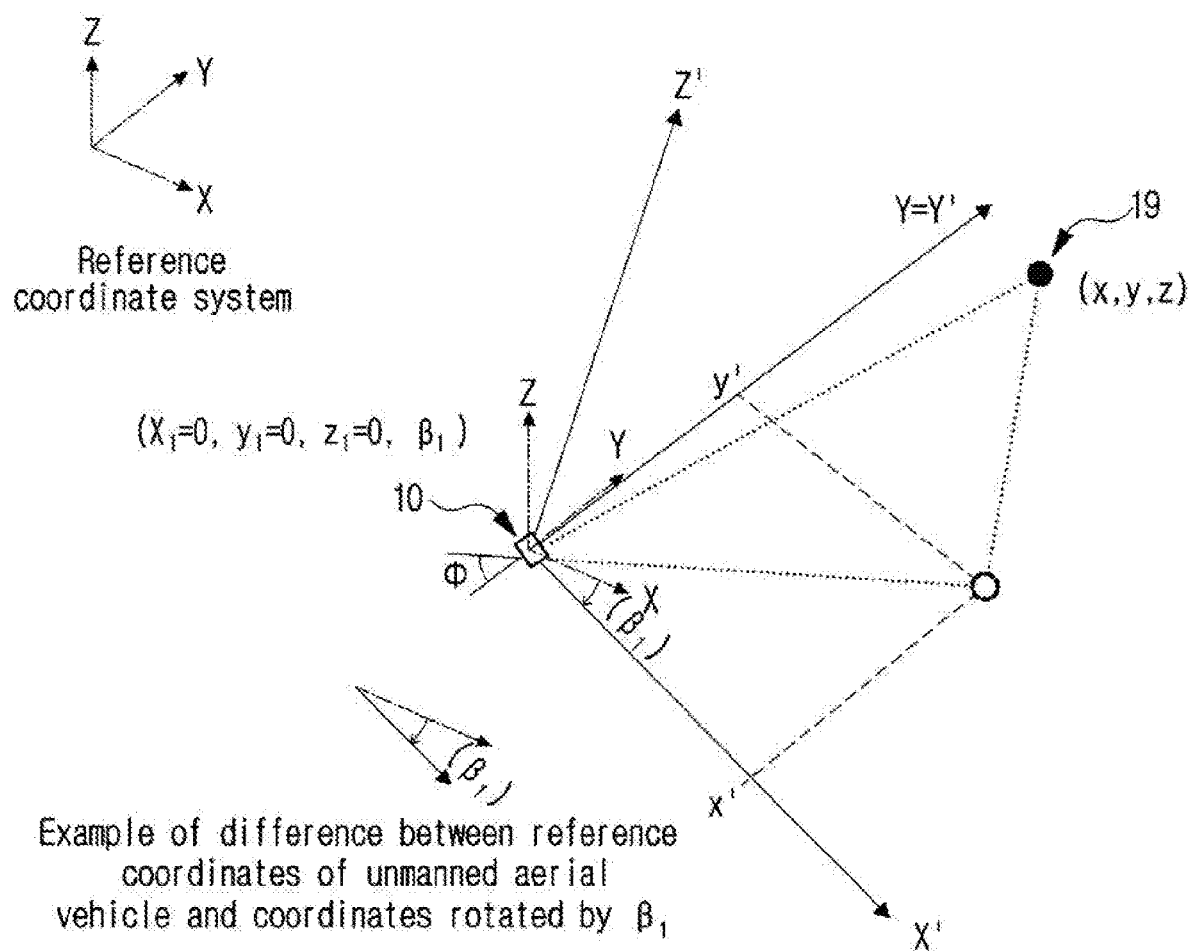
FIG. 5A is a diagram illustrating a location relation between an unmanned aerial vehicle and a signal source according to an embodiment of the present disclosure.
Figure 5B:
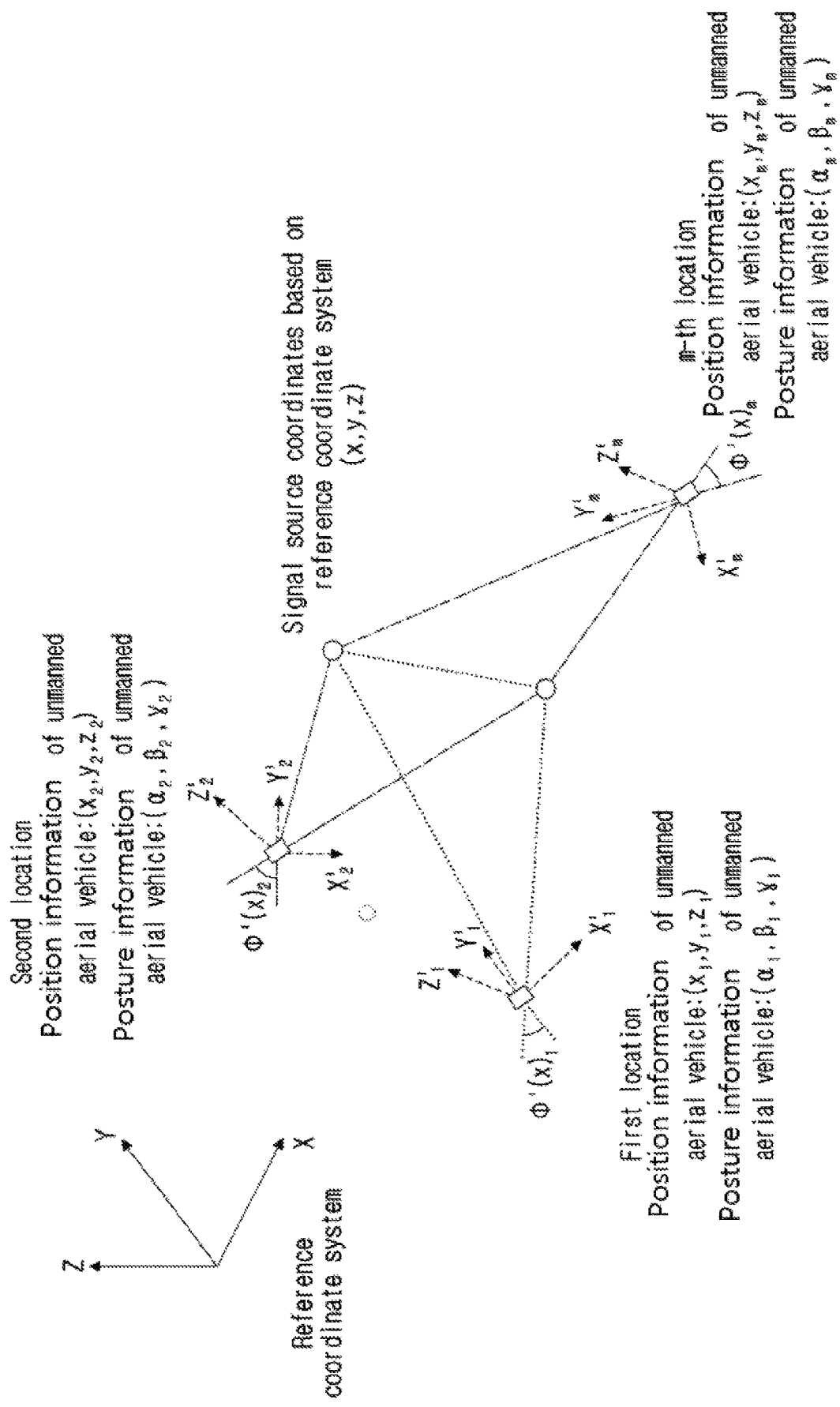
FIG. 5B is a diagram illustrating a location relation between an unmanned aerial vehicle and a signal source at multiple positions on the basis of FIG. 5A.

FIG. 5A is a diagram illustrating a location relation between an unmanned aerial vehicle and a signal source according to an embodiment of the present disclosure. FIG. 5B is a diagram illustrating a location relation between an unmanned aerial vehicle and a signal source at multiple positions on the basis of FIG. 5A.

First, referring to FIG. 5a, in the case where the unmanned aerial vehicle 10 is present at a first position ($x_1$, $y_1$, $z_1$) based on a three-dimensional reference coordinate system and has first posture information ($\alpha_1$, $\beta_1$, $\gamma_1$) indicating yaw, pitch, and roll angles of the unmanned aerial vehicle 10, a relation between a location (x, y, z) of the signal source 19 and the azimuth ($\Phi$) for the linear array antenna 27 will be described.

When the posture of the unmanned aerial vehicle 10 does not have any rotation with respect to the reference coordinate system (specifically, $\alpha_1=0$, $\beta_1=0$, $\gamma_1=0$), a relative location from the unmanned aerial vehicle 10 to the signal source is represented by ($x-x_1$, $y-y_1$, $z-z_1$) based on the reference coordinate system.

Rotated at any angle ($\alpha_1$, $\beta_1$, $\gamma_1$) with respect to the reference coordinate system, when the unmanned aerial vehicle 10 is present, the relative location from the unmanned aerial vehicle 10 to the signal source is represented by ($x'-x_1$, $y'-y_1$, $z'-z_1$) based on a rotated coordinate system ($X'$, $Y'$, $Z'$) corresponding to the rotated position of the unmanned aerial vehicle 10.

For the m-th position (m=1, 2, . . . , M, wherein M is a natural number) of the unmanned aerial vehicle, a relation between the coordinates (x, y, z) of the reference coordinate system and the coordinates (x', y', z') of the rotated coordinate system is represented as shown in Equation 6 and Equation 7 below.

$$x = Qx' \qquad \text{[Equation 6]}$$

$$\text{where } x = \begin{bmatrix} x - x_l \\ y - y_l \\ z - z_l \end{bmatrix}, x' = \begin{bmatrix} x' - x_l \\ y' - y_l \\ z' - z_l \end{bmatrix},$$

$$Q = \begin{bmatrix} \cos\beta\cos\alpha & -\cos\gamma\sin\alpha + \sin\gamma\sin\beta\cos\alpha & \sin\gamma\sin\alpha + \cos\gamma\sin\beta\cos\alpha \\ \cos\beta\sin\alpha & \cos\gamma\cos\alpha + \sin\gamma\sin\beta\sin\alpha & -\sin\gamma\cos\alpha + \cos\gamma\sin\beta\sin\alpha \\ -\sin\beta & \sin\gamma\cos\beta & \cos\gamma\cos\beta \end{bmatrix}$$

$$x' = Q^{-1}x \qquad \text{[Equation 7]}$$

$$\text{where } x = \begin{bmatrix} x - x_l \\ y - y_l \\ z - z_l \end{bmatrix}, x' = \begin{bmatrix} x' - x_l \\ y' - y_l \\ z' - z_l \end{bmatrix},$$

$$Q = \begin{bmatrix} \cos\beta\cos\alpha & -\cos\gamma\sin\alpha + \sin\gamma\sin\beta\cos\alpha & \sin\gamma\sin\alpha + \cos\gamma\sin\beta\cos\alpha \\ \cos\beta\sin\alpha & \cos\gamma\cos\alpha + \sin\gamma\sin\beta\sin\alpha & -\sin\gamma\cos\alpha + \cos\gamma\sin\beta\sin\alpha \\ -\sin\beta & \sin\gamma\cos\beta & \cos\gamma\cos\beta \end{bmatrix}$$

With the unmanned aerial vehicle 10 rotated by first posture ($\alpha_1$, $\beta_1$, $\gamma_1$) a relation between the azimuth ($\Phi'$) from the linear array antenna 27 to the signal source 19 and the location (x, y, z) of the signal source based on the reference coordinate system may be represented by Equation 8 below.

$$\phi'(x) = \tan^{-1}\frac{y'}{x'} = \tan^{-1}\frac{[Q^{-1}x]_{12}}{[Q^{-1}x]_{11}} \qquad \text{[Equation 8]}$$

Herein, $[A]_{i,j}$ denotes the value in the i-th row and the j-th column of matrix A.

As described above, when the unmanned aerial vehicle 10 has the first posture information ($\alpha_1$, $\beta_1$, $\gamma_1$) and is present at the first position ($x_1$, $y_1$, $z_1$), a relation expression in azimuth between the signal source 19 and the linear array antenna 27 of the unmanned aerial vehicle 10 is established as shown in Equation 8.

Hereinafter, in various embodiments of the present disclosure, the azimuth based on the relation expression represented by Equation 3 is described as a predicted azimuth.

In the meantime, referring to FIG. 5B, the signal source location identification unit 29 may identify multiple position information and multiple posture information corresponding to multiple UAV positions, and may establish relation expressions with the respective predicted azimuths. Specifically, the unmanned aerial vehicle 10 may calculate a relation expression for a first predicted azimuth ($\phi'_1$) on the basis of the first position information ($x_1$, $y_1$, $z_1$) and the first posture information ($\alpha_1$, $\beta_1$, $\gamma_1$) at the first position, and may calculate a relation expression for a second predicted azimuth ($\Phi'_2$) on the basis of second position information ($x_2$, $y_2$, $z_2$) and second posture information ($\alpha_2$, $\beta_2$, $\gamma_2$) at a second position. Similarly, it is possible to calculate a relation expression for the m-th predicted azimuth ($\phi'_m$) on the basis of the m-th position information ($x_m$, $y_m$, $z_m$) and the m-th posture information ($\alpha_m$, $\beta_m$, $\gamma_m$) at the m-th (m=1, 2, ..., M) position.

Further, the signal source location identification unit 29 may identify measured azimuths, at the respective multiple positions, by detect RF signals received at the linear array antenna 27. Specifically, it is possible to identify a first measured azimuth ($\hat{\phi}'_1$) at the first position, a second measured azimuth ($\hat{\phi}'_2$) at the second position, and the m-th measured azimuth ($\hat{\phi}'_m$) at the m-th position.

In the meantime, a relation between the predicted azimuth and the measured azimuth as described above may be represented as shown in Equation 9 below.

$$\hat{\phi}' = \phi'(x) + n \quad \text{[Equation 9]}$$

Herein, $\hat{\phi}'$ is a vector (Equation 10) consisting of measured azimuths that are measured at multiple (m=1, 2, ..., M) positions; $\phi'(x)$ is a vector (Equation 11) consisting of predicted azimuths based on Equation 3; and n is a vector (Equation 12) consisting of measurement errors.

$$\hat{\phi}' = [\hat{\phi}'_1, \ldots, \hat{\phi}'_M]^T \quad \text{[Equation 10]}$$

$$\phi'(x) = [\phi'(x)_1, \ldots, \phi'(x)_M]^T \quad \text{[Equation 11]}$$

$$n = [n_1, \ldots, n_L]^T \quad \text{[Equation 12]}$$

The signal source location identification unit 29 may determine the three-dimensional location information (x, y, z) of the signal source 19 considering the relation between the predicted azimuth and the measured azimuth shown in Equation 4 and through operation that minimizes the measurement errors between M predicted azimuths and measured azimuths.

For example, the signal source location identification unit 29 may determine, based on least squares (LS) or maximum likelihood (ML) method, the three-dimensional location information (x, y, z) of the signal source 19 using M predicted azimuths and measured azimuths.

As another example, the signal source location identification unit 29 may determine the three-dimensional location information (x, y, z) of the signal source 19 by an iterative procedure based on gradient descent, the Gauss-Newton method, the Newton-Raphson method, or the like.

When performing the iterative procedure based on the above-described method, an initial location information needs to be set as close as possible to the real location considering computational complexity and convergence in the iterative procedure. To this end, the signal source location identification unit 29 may calculate a two-dimensional initial location information using the multiple measured azimuths measured at the respective multiple positions. For example, the signal source location identification unit 29 may calculate the two-dimensional initial location information on the basis of Equation 13 below.

$$\begin{bmatrix} x_{init} \\ y_{init} \end{bmatrix} = (A^T A)^{-1} A^T b \text{ where} \quad \text{[Equation 13]}$$

-continued $$A^T = \begin{bmatrix} \sin(\hat{\phi}'_1) & -\cos(\hat{\phi}'_1) \\ \vdots & \vdots \\ \sin(\hat{\phi}'_M) & -\cos(\hat{\phi}'_M) \end{bmatrix},$$

$$b = \begin{bmatrix} \sin(\hat{\phi}'_1)x_1 - \cos(\hat{\phi}'_1)y_1 \\ \vdots \\ \sin(\hat{\phi}'_M)x_m - \cos(\hat{\phi}'_M)y_M \end{bmatrix}$$

That is, the signal source location identification unit 29 may calculate, from M measured azimuths and two-dimensional location coordinates (($x_m$, $y_m$), wherein m=1, 2, ..., M) of the unmanned aerial vehicle, a two-dimensional initial location ($x_{init}$, $y_{init}$) of the signal source through Equation 13.

Further, the signal source location identification unit 29 may set the vertical coordinate $z_{init}$, from three-dimensional initial location information ($x_{init}$, $y_{init}$, $z_{init}$) used for the iterative procedure to identify the location information of the signal source, to 0 or to any value set within any range.

In the meantime, in order to determine the two-dimensional location information (x, y) of the signal source 19, position information, posture information, and measured azimuths on at least two positions are required. In order to determine the three-dimensional location information (x, y, z) of the signal source 19, position information, posture information, and measured azimuths on at least three positions are required. Based on this, when calculation of the two-dimensional location information (x, y) of the signal source 19 is required, the signal source location identification unit 29 identifies the position information, the posture information, and the measured azimuths on at least two positions to calculate the two-dimensional location information (x, y) of the signal source 19. Similarly, when calculation of the three-dimensional location information (x, y, z) of the signal source 19 is required, the signal source location identification unit 29 identifies the position information, the posture information, and the measured azimuths on at least three positions to calculate the three-dimensional location information (x, y, z) of the signal source 19.

In the embodiment of the present disclosure, although it is described that the signal source location identification unit 29 identifies the three-dimensional location information of the signal source using multiple position information, multiple posture information, and multiple measured azimuths, the present disclosure is not limited thereto.

It is sufficient for the present invention to include a configuration of identifying the measured azimuth from the linear array antenna 27 provided in the unmanned aerial vehicle to the signal source, and a configuration of calculating the three-dimensional location information of the signal source considering multiple position information, multiple posture information, multiple measured azimuths, and a relation with the signal source. Based on this technical idea, the present invention is modified or applies in various ways.

Figure 6A:
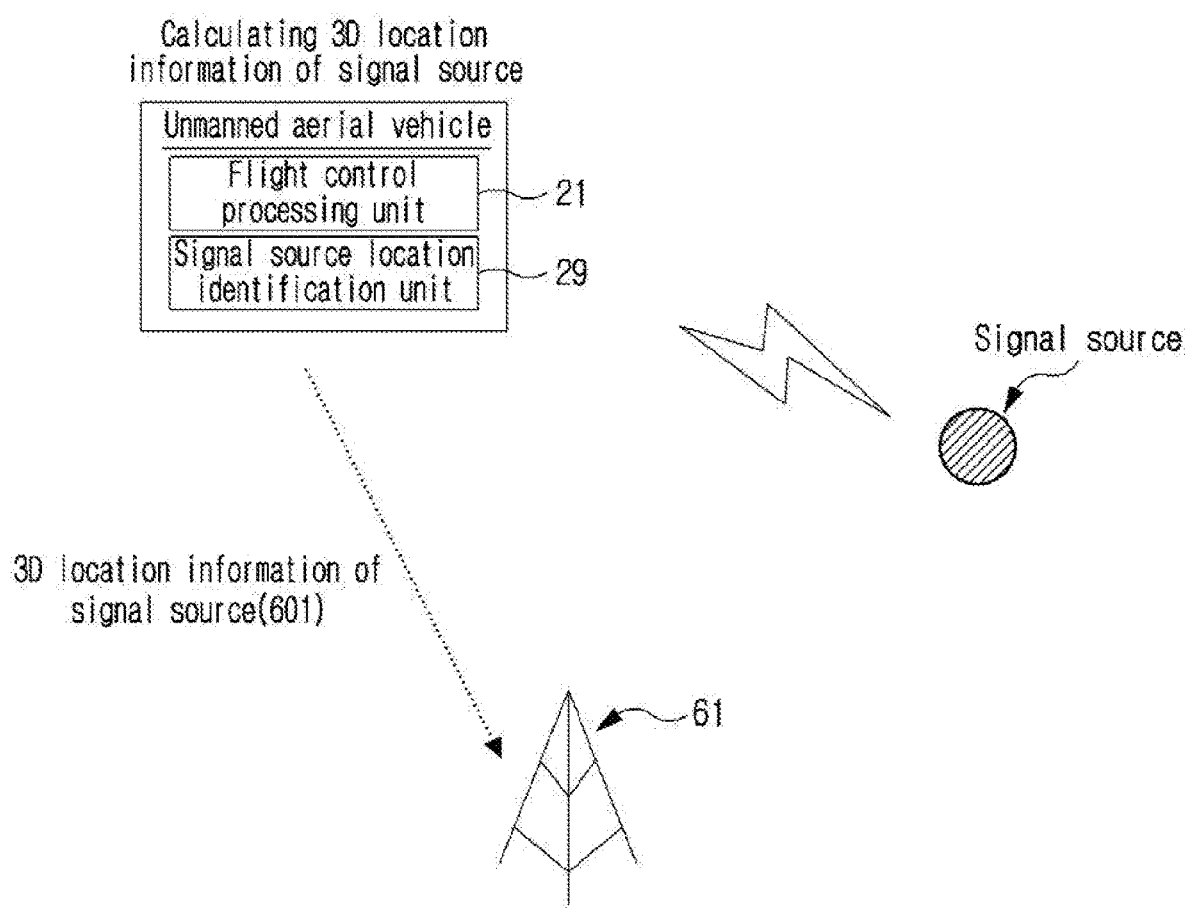
FIGS. 6A to 6C are diagrams illustrating an example of an operation of identifying location information of a signal source by using an unmanned aerial vehicle according to an embodiment of the present disclosure.

For example, the signal source location identification unit 29 may identify the three-dimensional location information of the signal source using the multiple position information, the multiple posture information, and the multiple measured azimuths, and may provide the three-dimensional location information to the flight control processing unit 21. The flight control processing unit 21 may provide the three-dimensional location information 601 (refer to FIG. 6A) of the signal source to a ground station 61.

Figure 6B:
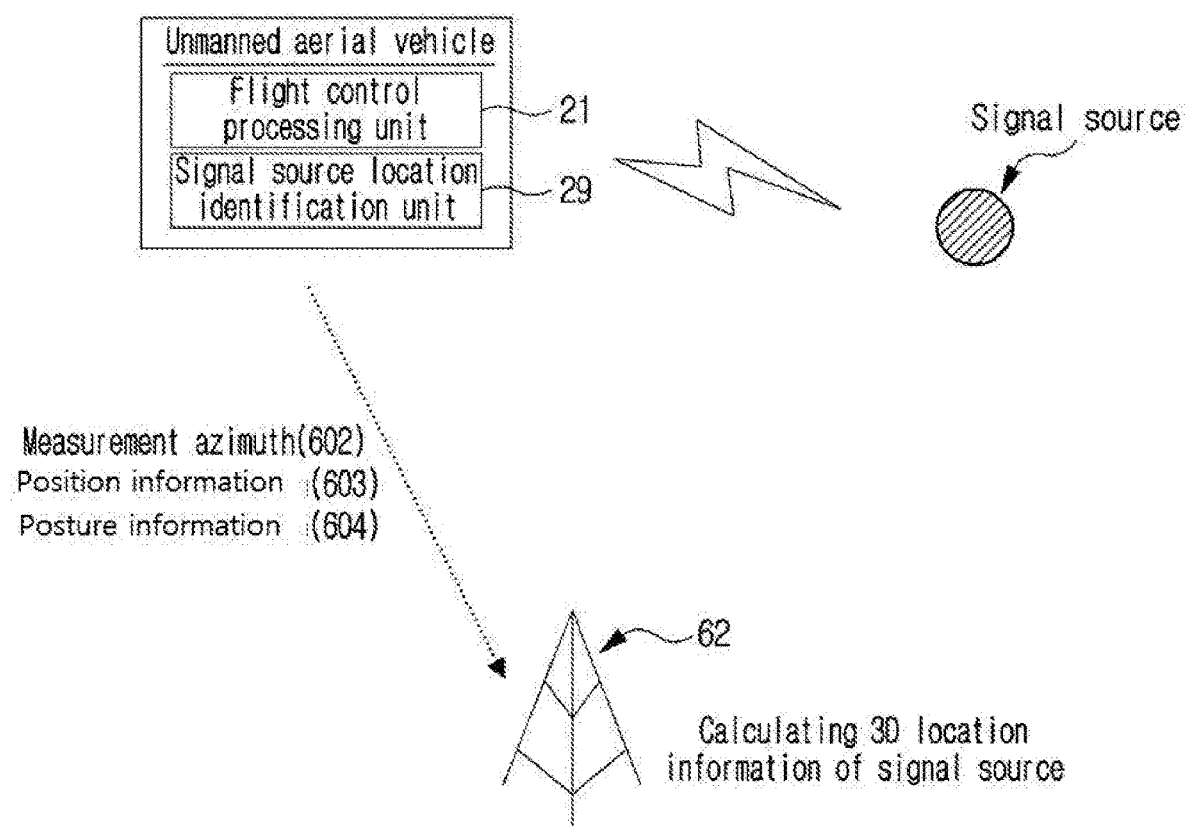

As another example, the signal source location identification unit 29 may provide the measured azimuth to the flight control processing unit 21, and the flight control processing unit 21 may provide the multiple measured azimuths 602 (refer to FIG. 6B) and multiple position information 603 and multiple posture information 604 corresponding thereto to the ground station 62. Accordingly, the ground station may calculate the three-dimensional location information of the signal source using the multiple position information, the multiple posture information, and the multiple measured azimuths.

Herein, a single unmanned aerial vehicle may provide, to the ground station 62, multiple position information, multiple posture information, and multiple measured azimuths respectively corresponding to the multiple positions. Alternatively, multiple unmanned aerial vehicles provided at different positions may provide, to the ground station 62, the respective multiple position information, the respective multiple posture information, and the respective multiple measured azimuths.

Figure 6C:
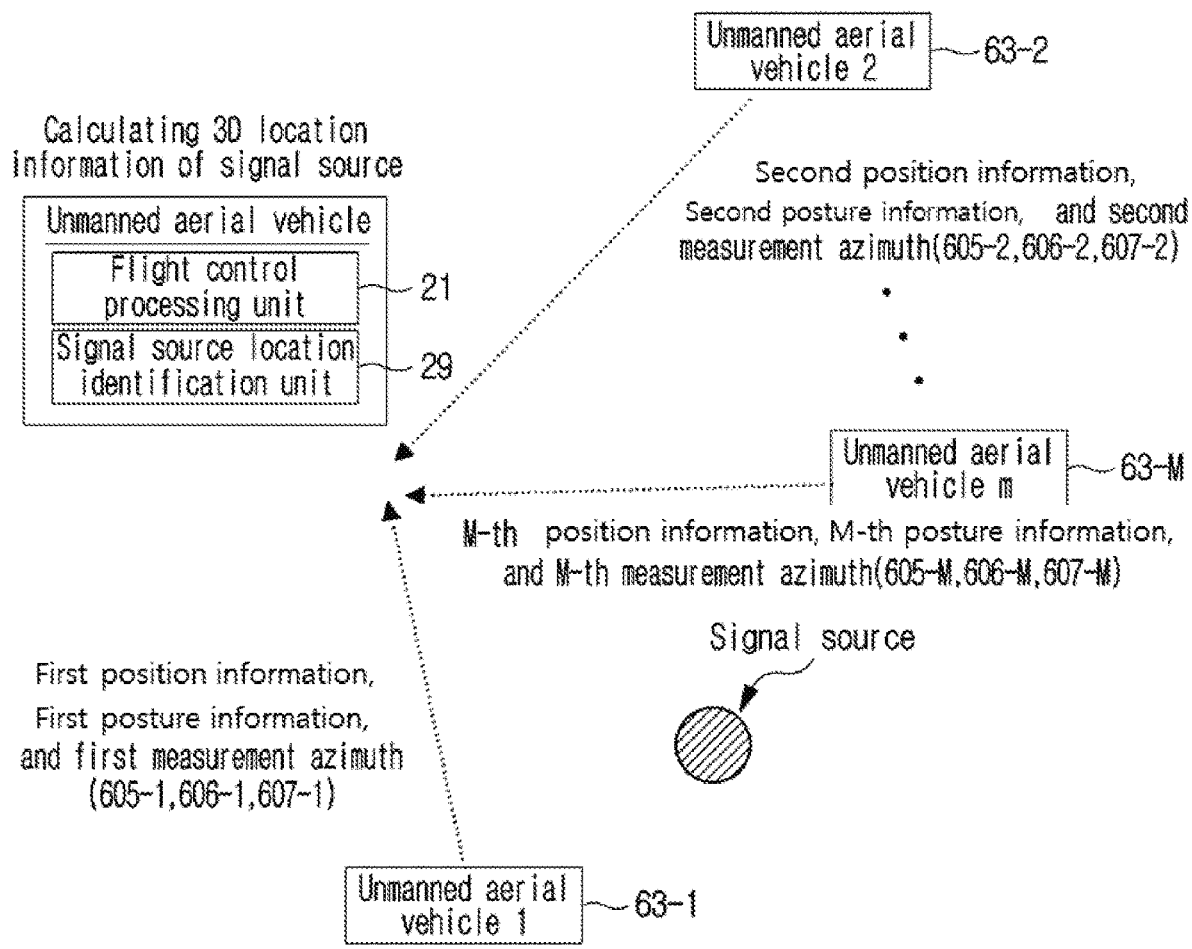

As another example, the flight control processing unit 21 may receive, through communication with other unmanned aerial vehicles 63-1, 63-2, . . . , 63-M (refer to FIG. 6C), position information 605-1, 605-2, . . . , 605-M, posture information 606-1, 606-2, . . . , 606-M, and measured azimuth 607-1, 607-2, . . . , 607-M identified by the unmanned aerial vehicles. The signal source location identification unit 29 may calculate the three-dimensional location information of the signal source using the position information, the posture information, and the measured azimuth identified by itself and also using the position information 605-1, 605-2, . . . , 605-M, the posture information 606-1, 606-2, . . . , 606-M, and the measured azimuth 607-1, 607-2, . . . , 607-M identified by the unmanned aerial vehicles.

Although the flight control unit 24 and the signal source location identification unit 29 are described as separate functional units to clearly describe the features, this does not necessarily mean that the constituent elements are separated. That is, a plurality of constituent elements may be integrated into one hardware or software unit, or one constituent element may be distributed into a plurality of hardware or software units.

Figure 7:
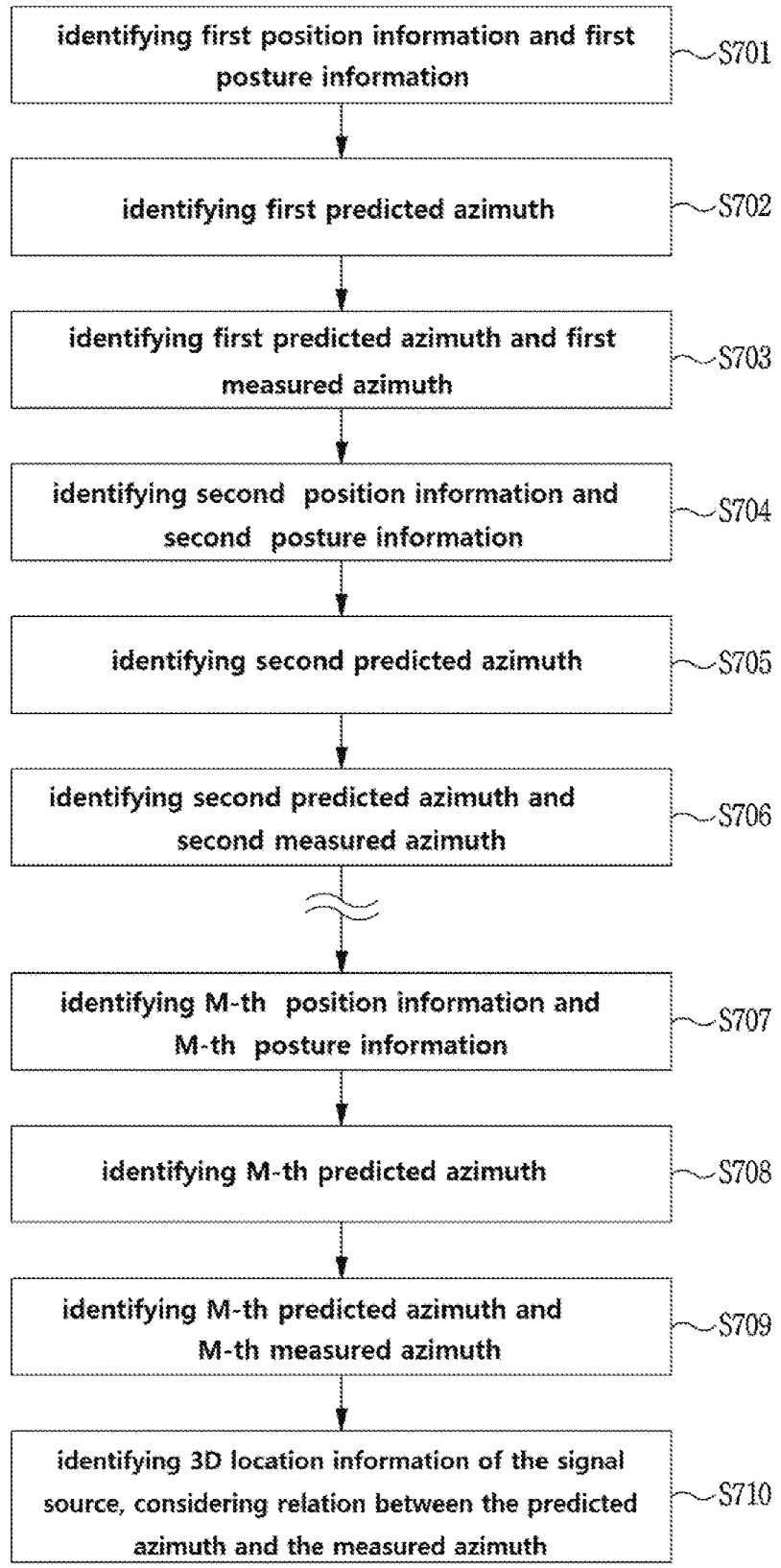
FIG. 7 is a flowchart illustrating a sequence of a method of identifying location information of a signal source according to an embodiment of the present disclosure.

FIG. 7 is a flowchart illustrating a sequence of a method of identifying location information of a signal source according to an embodiment of the present disclosure.

The method of identifying the location information of the signal source according to the embodiment of the present disclosure may be performed by the above-described unmanned aerial vehicle.

At step S701, the unmanned aerial vehicle may identify first position information $(x_1, y_1, z_1)$ and first posture information $(\alpha_1, \beta_1, \gamma_1)$ at a predetermined first position.

As described above with reference to FIGS. 5A and 5B, when the unmanned aerial vehicle 10 has the first posture information $(\alpha_1, \beta_1, \gamma_1)$ and is present at the first position $(x_1, y_1, z_1)$ a relation in predicted azimuth between the signal source 19 and the unmanned aerial vehicle is represented as shown in Equation 8. Therefore, at step S702, the unmanned aerial vehicle may calculate, on the basis of Equation 8, a relation expression of a first predicted azimuth $(\Phi'_1)$ at the first position.

At step S703, the unmanned aerial vehicle may identify the measured azimuth, specifically, a first measured azimuth $(\hat{\phi}'_1)$, at the first position by detect the RF signal received at the linear array antenna provided in the unmanned aerial vehicle.

The unmanned aerial vehicle may identify, at a second position, second position information $(x_2, y_2, z_2)$ and second posture information $(\alpha_2, \beta_2, \gamma_2)$ at step S704. Considering the position information and the posture information shown in Equation 8 and the relation for the predicted azimuth, the unmanned aerial vehicle may calculate a relation expression of a second predicted azimuth $(\Phi'_2)$ corresponding to second position information $(x_2, y_2, z_2)$ and second posture information $(\alpha_2, \beta_2, \gamma_2)$ at step S705.

Further, the unmanned aerial vehicle may identify a measured azimuth, specifically, second measured azimuth $(\hat{\phi}'_2)$ at the second position by detect the RF signal received at the linear array antenna provided in the unmanned aerial vehicle, at step S706.

Furthermore, the unmanned aerial vehicle may repeatedly perform the steps from S701 to S703 or the steps from S704 to S706, so that the unmanned aerial vehicle may identify, at the m-th (m=1, 2, . . . , M) position, the m-th position information $(x_m, y_m, z_m)$ and the m-th posture information $(\alpha_m, \beta_m, \gamma_m)$, the m-th prediction azimuth $(\phi'_m)$, and the m-th measured azimuth $(\hat{\phi}'_m)$, at steps S707, S708, and S709, respectively.

In the meantime, when the elevation ($\theta$) is 0°, the measured azimuth is accurately measured. However, when the elevation ($\theta$) is not 0°, there is a difference between the measured azimuth and the real azimuth. Particularly, as the elevation ($\theta$) is large and the azimuth exceeds the reference value (0°), the difference value between the real azimuth and the estimated azimuth increases.

Based on this, at steps S703, S706, and S709, the unmanned aerial vehicle may correct a measured azimuth, specifically, first to m-th measured azimuths $(\hat{\phi}'_1, \ldots, \hat{\phi}'_m)$ using the nominal elevation $(\theta_{norm})$ and the position of the unmanned aerial vehicle, thereby calculating first to m-th corrected azimuths.

A detailed operation of correcting the above-described measured azimuth will be described later with reference to FIG. 9.

At steps S701 to S709 described above, while moving, the unmanned aerial vehicle may collect the m-th position information $(x_m, y_m, z_m)$, the m-th posture information $(\alpha_m, \beta_m, \gamma_m)$, the m-th predicted azimuth $(\phi'_m)$, and the m-th measured azimuth $(\hat{\phi}'_m)$ at the m-th (m=1, 2, . . . , M) position, or may receive, from another unmanned aerial vehicle present at the m-th (m=1, 2, . . . , M) position, the m-th position information $(x_m, y_m, z_m)$, the m-th posture information $(\alpha_m, \beta_m, \gamma_m)$, the m-th predicted azimuth $(\phi'_m)$, the m-th measured azimuth $(\hat{\phi}'_m)$, and the like, thereby identifying the m-th position information $(x_m, y_m, z_m)$, the m-th posture information $(\alpha_m, \beta_m, \gamma_m)$, the m-th predicted azimuth $(\phi'_m)$, the m-th measured azimuth $(\hat{\phi}'_m)$, and the like.

As another example, the unmanned aerial vehicle may receive, from another unmanned aerial vehicle present at the m-th (m=1, 2, . . . , M) position, the m-th position information $(x_m, y_m, z_m)$, the m-th posture information $(\alpha_m, \beta_m, \gamma_m)$, the m-th measured azimuth $(\hat{\phi}'_m)$, and the like, and may calculate the relation expression of the m-th predicted azimuth $(\phi'_m)$ using the m-th position information $(x_m, y_m, z_m)$ and the m-th posture information $(\alpha_m, \beta_m, \gamma_m)$.

In the meantime, at step S710, considering the relation between the predicted azimuth ($\phi'$) and the measured azimuth ($\hat{\phi}'$) shown in Equation 9, the unmanned aerial vehicle may determine the three-dimensional location information (x, y, z) of the signal source through operation that minimizes the measurement errors between M predicted azimuths and measured azimuths.

For example, the unmanned aerial vehicle may determine, on the basis of least squares (LS) or maximum likelihood (ML) method, the three-dimensional location information (x, y, z) of the signal source using M predicted azimuths and measured azimuths.

As another example, the unmanned aerial vehicle may determine the three-dimensional location information (x, y, z) of the signal source by an iterative procedure based on gradient descent, the Gauss-Newton method, the Newton-Raphson method, or the like.

When performing the iterative procedure based on the above-described method, an initial location information needs to be set as close as possible to the actual position, for computational complexity and convergence in the iterative procedure. To this end, the unmanned aerial vehicle may calculate two-dimensional initial location information using multiple (for example, M) measured azimuths measured at the respective multiple positions. For example, the unmanned aerial vehicle may calculate the two-dimensional initial location information on the basis of Equation 13 described above.

Further, the unmanned aerial vehicle may set the vertical coordinate $z_{init}$, from the three-dimensional initial location information $(x_{init}, y_{init}, z_{init})$ used for the iterative procedure, to 0 or to any value set within any range.

Figure 8:
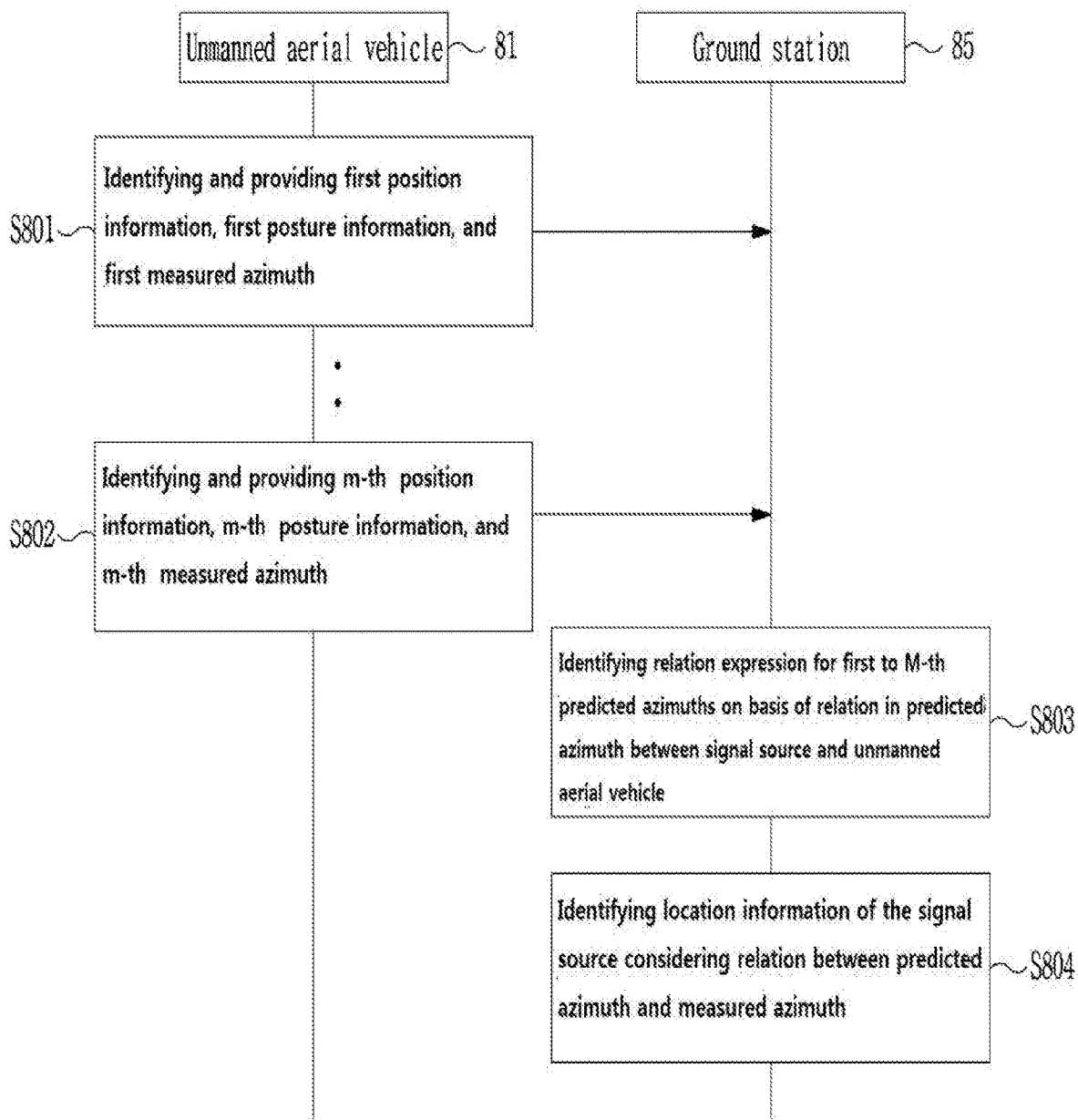
FIG. 8 is a flowchart illustrating a sequence of a method of identifying location information of a signal source according to another embodiment of the present disclosure.

FIG. 8 is a flowchart illustrating a sequence of a method of identifying location information of a signal source according to another embodiment of the present disclosure.

The method of identifying the location information of the signal source according to the embodiment of the present disclosure may be performed by the above-described unmanned aerial vehicle and the ground station.

The method of identifying the location information of the signal source according to the later embodiment of the present disclosure is the same as the method of identifying the location information of the signal source according to the former embodiment of the present disclosure. However, there is a difference as follows. In the method of identifying the location information of the signal source according to the former embodiment of the present disclosure, it is described that the unmanned aerial vehicle processes all the operations, such as identifying the position information, identifying the posture information, calculating the relation expression of the predicted azimuth, identifying the measured azimuth, identifying the three-dimensional location information of the signal source, and the like. In the method of identifying the location information of the signal source according to the later embodiment of the present disclosure, it is configured that the unmanned aerial vehicle performs the operations, such as identifying the position information, identifying the posture information, identifying the measured azimuth, and the like; and the ground station performs the operations, such as receiving the position information, the posture information, the measured azimuth, etc. from the unmanned aerial vehicle, calculating the relation expression of the predicted azimuth, identifying the three-dimensional location information of the signal source, and the like.

Specifically, at step S801, the unmanned aerial vehicle 81 may identify first position information $(x_1, y_1, z_1)$, first posture information $(\alpha_1, \beta_1, \gamma_1)$, and a first measured azimuth $(\hat{\phi}'_1)$ at a predetermined first position, and may provide the identified information to the ground station 85.

The unmanned aerial vehicle 81 performs the same operation as in step S801, so that the unmanned aerial vehicle 81 may identify the m-th position information $(x_m, y_m, z_m)$, the m-th posture information $(\alpha_m, \beta_m, \gamma_m)$, and the m-th measured azimuth $(\hat{\phi}'_m)$ at the m-th (m=1, 2, ..., M) position and may provide the identified information to the ground station 85 at step S802.

At steps S801 and S802, while the same unmanned aerial vehicle moves, the same unmanned aerial vehicle may identify the position information, the posture information, and the measured azimuth at the m-th (m=1, 2, M) position with respect to M position s, and may provide the identified information to the ground station 85. Alternatively, multiple unmanned aerial vehicles provided at different M positions may identify the respective position information, the respective posture information, and the respective measured azimuths, and the multiple unmanned aerial vehicles may individually provide the identified respective pieces of information to the ground station 85.

As described above with reference to FIGS. 5A and 5B, when the unmanned aerial vehicle has the first posture information $(\alpha_1, \beta_1, \gamma_1)$ and is present at the first position $(x_1, y_1, z_1)$, the relation in prediction azimuth between the signal source and the unmanned aerial vehicle is represented as shown in Equation 3. Accordingly, at step S803, the ground station 85 may calculate, on the basis of Equation 8, a relation expression for first to M-th predicted azimuths $(\phi'_1, \ldots, \phi'_M)$ with respect to first to M-th position s, respectively.

In the meantime, at step S804, considering the relation between the predicted azimuth $(\phi')$ and the measured azimuth $(\hat{\phi}')$ shown in Equation 9, the ground station 85 may determine the three-dimensional location information (x, y, z) of the signal source through operation that minimizes the measurement errors between M predicted azimuths and measured azimuths.

For example, the ground station 85 may determine, on the basis of least squares (LS) or maximum likelihood (ML) method, the three-dimensional location information (x, y, z) of the signal source using M predicted azimuths and measured azimuths.

As another example, the ground station 85 may determine the three-dimensional location information (x, y, z) of the signal source by an iterative procedure based on gradient descent, the Gauss-Newton method, the Newton-Raphson method, or the like.

When performing the iterative procedure based on the above-described method, an initial location information needs to be set as close as possible to the actual location considering computational complexity and convergence in the iterative procedure. To this end, the ground station 85 may calculate two-dimensional initial location information using multiple (for example, M) measured azimuths measured at the respective multiple positions. For example, the ground station may calculate the two-dimensional initial location information on the basis of Equation 13 described above.

Further, the ground station 85 may set the vertical coordinate $z_{init}$, from the three-dimensional initial location information $(x_{init}, y_{init}, z_{init})$ used for the iterative procedure, to 0 or to any value set within any range.

Figure 9:
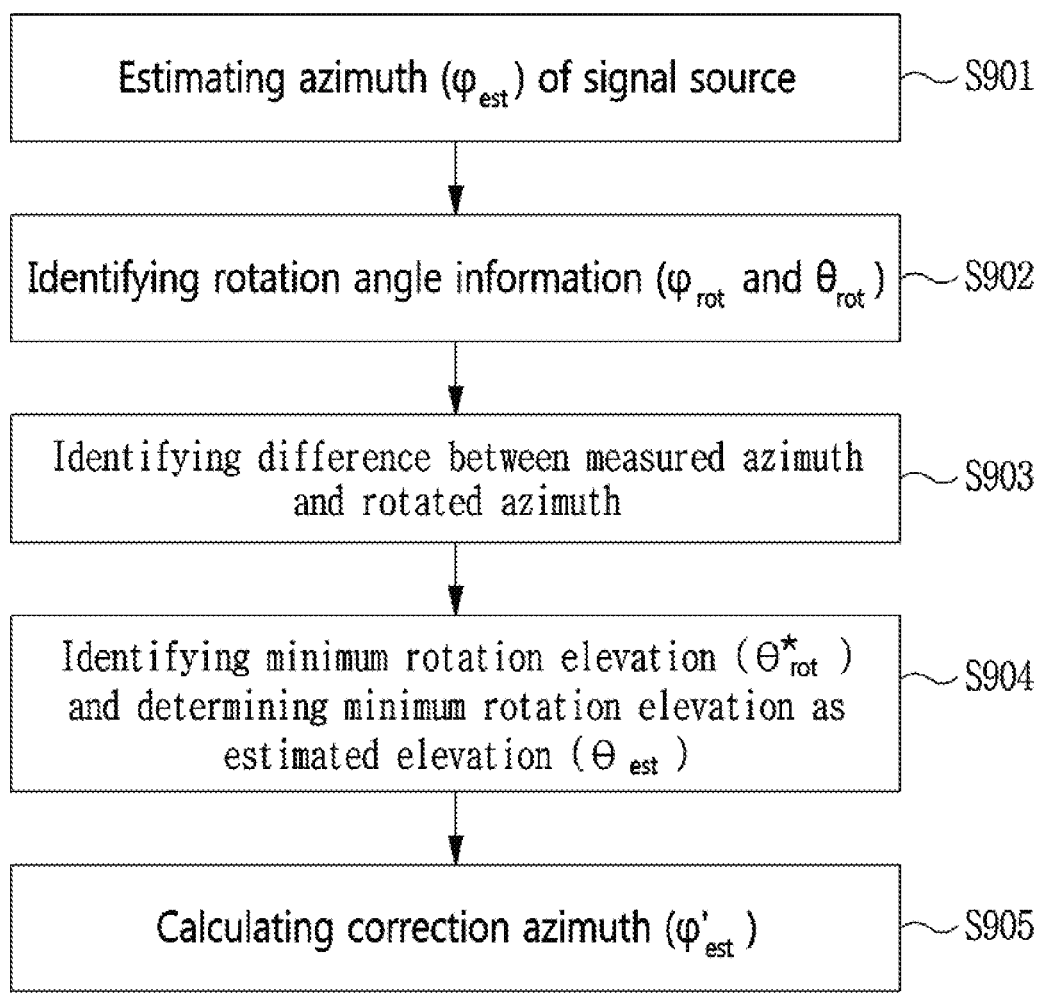
FIG. 9 is a flowchart illustrating in detail a measured azimuth correction process included in the method of identifying the location information of the signal source according to the embodiment of the present disclosure.

FIG. 9 is a flowchart illustrating in detail an azimuth correction process included in the method of identifying the location information of the signal source according to the embodiment of the present disclosure.

First, the unmanned aerial vehicle may estimate the azimuth $(\phi_{est})$ of the signal source by detecting the RF signal received at the linear array antenna, at step S901.

The steering vector in the linear array antenna including multiple (for example, p) antenna elements may be represented as shown in Equation 1 described above. As shown in FIG. 3, when the linear array antenna is linearly provided on the X-axis, the element values of the steering vectors corresponding to the respective antenna elements are calculated through the operation in Equation 2 described above. By using Equation 2 again, when the elevation (θ) is 0°, the element value of the steering vector consisting of only the azimuth (ϕ) is represented as shown in Equation 3 described above. Therefore, the unmanned aerial vehicle may calculate the element value of the steering vector through the operation in Equation 3 described above. As described above, the element value of the steering vector calculated through Equation 3 may be accurately measured when the elevation (θ) is 0°. From this, the azimuth (φ) of the signal source may be accurately estimated.

However, in the case where the elevation (θ) is not 0°, when the azimuth (ϕ) of the signal source is estimated using the steering vector calculated through Equation 3, there is a difference with the actual azimuth (ϕ).

Based on this, the unmanned aerial vehicle may correct the azimuth using the nominal elevation ($\theta_{norm}$) and the position of the unmanned aerial vehicle.

At step S902, the unmanned aerial vehicle may identify the posture information (yaw (α), pitch (β), and roll (γ)) of the unmanned aerial vehicle, and may use the identified posture information to identify the rotated angles ($\phi_{rot}$ and $\theta_{rot}$) of the unmanned aerial vehicle, which is based on the nominal elevation ($\theta_{norm}$).

Herein, the nominal elevation ($\theta_{norm}$) is a fixed value given according to the cruising altitude of the unmanned aerial vehicle, and may be a predetermined value that is approximately calculated on the basis of the altitude of the unmanned aerial vehicle and the approximate distance to the signal source. For example, when the unmanned aerial vehicle flies at an altitude of 2 km to find the signal source and the horizontal distance to the signal source is about 20 km, the nominal elevation ($\theta_{norm}$) is set to −5 degrees.

At step S903, the unmanned aerial vehicle may identify the difference ($|\phi_{est}-\phi_{rot}|$) between the measured azimuth and the rotated azimuth (hereinafter, referred to as a "rotated azimuth").

As step S902 described above, since the unmanned aerial vehicle identifies the rotation angle information ($\phi_{rot}$ and $\phi_{rot}$) of the unmanned aerial vehicle, which is based on the nominal elevation ($\theta_{norm}$) for all the azimuths within the range of azimuths, there may be multiple rotation azimuths ($\theta_{rot}$) of the unmanned aerial vehicle. At step S903, multiple identified difference values may be calculated. Based on this, at step S904, the unmanned aerial vehicle may identify the rotation angles ($\phi_{rot}$ and $\theta_{rot}$) corresponding to the smallest value among the multiple identified difference values, and may determine the identified rotated azimuth and the identified rotated elevation as the optimum rotated azimuth and the optimum rotated elevation ($\phi^*_{rot}$ and $\theta^*_{rot}$). Then, the unmanned aerial vehicle may determine the optimum rotated elevation ($\theta^*_{rot}$) as the estimated elevation ($\theta_{est}$).

Afterward, at step S905, the unmanned aerial vehicle may calculate the corrected azimuth ($\phi'_{est}$) by applying the estimated elevation ($\theta_{est}$) and the estimated azimuth ($\phi_{est}$) to Equation 4 described above.

Figure 10:
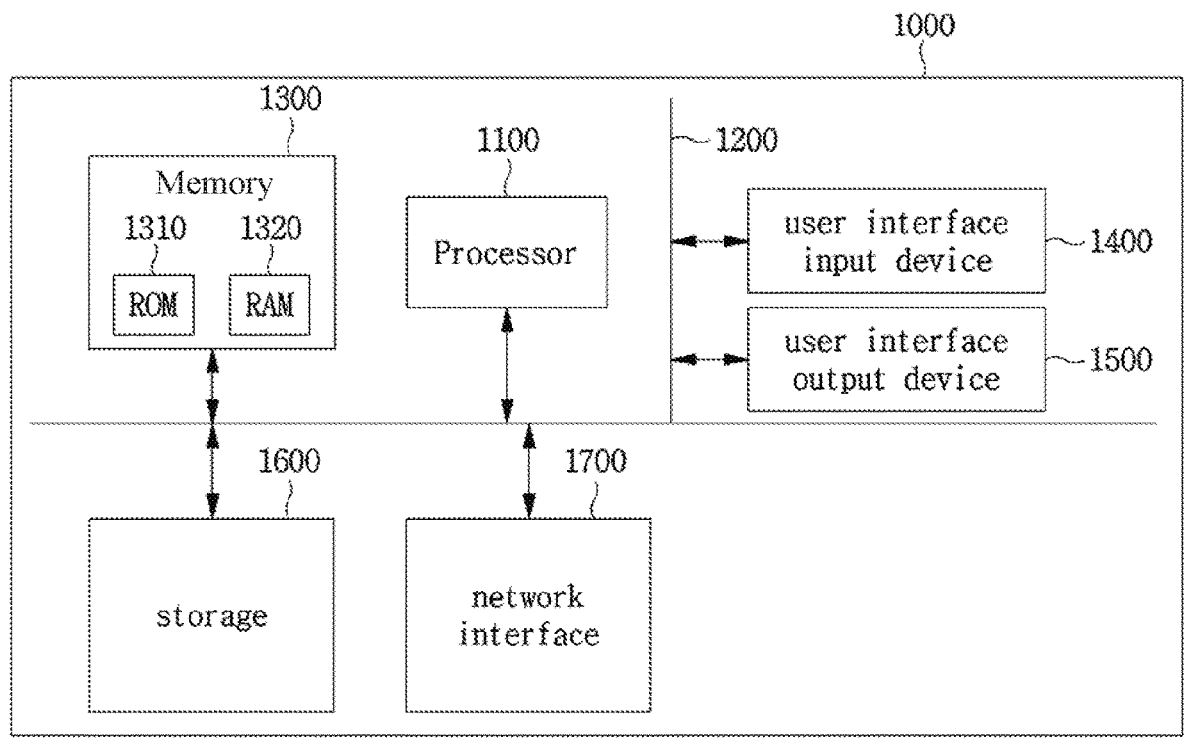
FIG. 10 is a block diagram illustrating an example of a computing system that executes a method and an apparatus for identifying location information of a signal source according to an embodiment of the present disclosure.

FIG. 10 is a block diagram illustrating an example of a computing system that executes a method and an apparatus for identifying location information of a signal source according to an embodiment of the present disclosure.

Referring to FIG. 10, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory). Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them. Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:
1. A method of identifying location information of a signal source by using an unmanned aerial vehicle, the method comprising:
  identifying, at a first position, first position information and first posture information of the unmanned aerial vehicle equipped with a linear array antenna;
  identifying, after identifying a first measured azimuth between the signal source and the linear array antenna at the first position, a first corrected azimuth in which the first measured azimuth is corrected considering a difference between the measured azimuth and an estimated azimuth according to a change in elevation;

identifying, at at least one second position, at least one second position information and at least one second posture information of the unmanned aerial vehicle equipped with the linear array antenna;

identifying, after identifying at least one second measured azimuth between the signal source and the linear array antenna at the at least one second position, at least one second corrected azimuth in which the at least one second measured azimuth is corrected considering the difference between the measured azimuth and the estimated azimuth according to the change in elevation; and estimating the location information of the signal source by using the first position information, the first posture information, the first corrected azimuth, at least one second position information, at least one second posture information, and the at least one second corrected azimuth.

2. The method of claim 1, wherein the identifying of the first corrected azimuth includes:

identifying at least one piece of first rotation angle information corresponding to the first posture information;

identifying a first estimated elevation by using the at least one piece of the first rotation angle information; and determining the first corrected azimuth by using the first measured azimuth and the first estimated elevation.

3. The method of claim 2, wherein the identifying of the first estimated elevation includes:

identifying a difference value between the first measured azimuth and at least one rotation azimuth included in the at least one piece of the first rotation angle information; and determining, after identifying the at least one piece of the first rotation angle information having a minimum difference with the first measured azimuth, the first estimated elevation corresponding to the at least one piece of the first rotation angle information having the minimum difference.

4. The method of claim 2, wherein the identifying of the first corrected azimuth includes performing operation in Equation 1 below, $$\phi'_{est}=\sin^{-1}(\sin \phi_{est}/\cos \theta_{est}) \quad \text{[Equation 1]}$$

wherein $\phi'_{est}$ denotes the first corrected azimuth, $\theta_{est}$ denotes the first estimated elevation, and $\phi_{est}$ denotes the first measured azimuth.

5. The method of claim 2, wherein the identifying of the at least one piece of the first rotation angle information includes identifying, by using the first posture information, at least one rotation azimuth and at least one rotation elevation that are based on a nominal elevation for all azimuths within a range of azimuths.

6. An apparatus for identifying location information of a signal source, the apparatus comprising:

a flight control processing unit identifying position information and posture information of an unmanned aerial vehicle, and controlling movement of the unmanned aerial vehicle;

a linear array antenna; and a signal source location identification unit configured to, measure, by using the linear array antenna, a measured azimuth corresponding to a signal received from the signal source;

identify a corrected azimuth in which the measured azimuth is corrected considering a difference between the measured azimuth and an estimated azimuth according to a change in elevation;

identify multiple position information, multiple posture information, and the multiple corrected azimuths respectively corresponding to multiple different positions; and identify three-dimensional location information of the signal source on the basis of the multiple position information, the multiple postures information, and the multiple corrected azimuths.

7. The apparatus of claim 6, wherein the signal source location identification unit is configured to, identify at least one piece of rotation angle information corresponding to the position information and the posture information;

identify an estimated elevation using the at least one piece of the rotation angle information; and determine the corrected azimuth using the measured azimuth and the estimated elevation.

8. The apparatus of claim 7, wherein the signal source location identification unit is configured to, identify a difference value between the measured azimuth and at least one rotation azimuth included in the at least one piece of the rotation angle information;

identify the at least one piece of the rotation angle information having a minimum difference with the measured azimuth; and determine the estimated elevation corresponding to the at least one piece of the rotation angle information having the minimum difference.

9. The apparatus of claim 7, wherein the signal source location identification unit performs operation in Equation 2 below, $$\phi'_{est}=\sin^{-1}(\sin \phi_{est}/\cos \theta_{est}) \quad \text{[Equation 2]}$$

wherein $\phi'_{est}$ denotes a first corrected azimuth, $\theta_{est}$ denotes a first estimated elevation, and $\phi_{est}$ denotes a first measured azimuth.

10. The apparatus of claim 7, wherein the signal source location identification unit identifies, by using the position and the posture, at least one rotation azimuth and at least one rotation elevation that are based on a nominal elevation for all azimuths within a range of azimuths.

11. The apparatus of claim 6, wherein the posture information includes information indicating a three-axis rotation angle of the unmanned aerial vehicle.

12. The apparatus of claim 6, wherein the flight control processing unit provides, to a ground station, the three-dimensional location information of the signal source provided from the signal source location identification unit.

13. The apparatus of claim 6, wherein the flight control processing unit provides, to a ground station estimating the three-dimensional location information of the signal source, the multiple pieces of the position information, the multiple pieces of the posture information, and the multiple measured azimuths.

14. A system for identifying location information of a signal source, the system comprising:

at least one unmanned aerial vehicle, equipped with a linear array antenna, configured to, identify a measured azimuth to the signal source on the basis of a signal transmitted and received through the linear array antenna;

identify position information and posture information of the least one unmanned aerial vehicle; and perform movement control; and a ground station configured to, receive the position information, the posture information, and the measured azimuth from the at least one unmanned aerial vehicle;

identify a corrected azimuth in which the measured azimuth is corrected considering a difference between the measured azimuth and an estimated azimuth according to a change in elevation;

identify multiple position information, multiple posture information, and the multiple corrected azimuths respectively corresponding to multiple difference positions; and identify three-dimensional location information of the signal source on the basis of the multiple position information, the multiple posture information, and the multiple corrected azimuths.

* * * * *